Dec. 4, 1962
S. J. D'AMICO
3,066,445
DISPLAYER LAMP AND PLANTER
Filed June 23, 1961
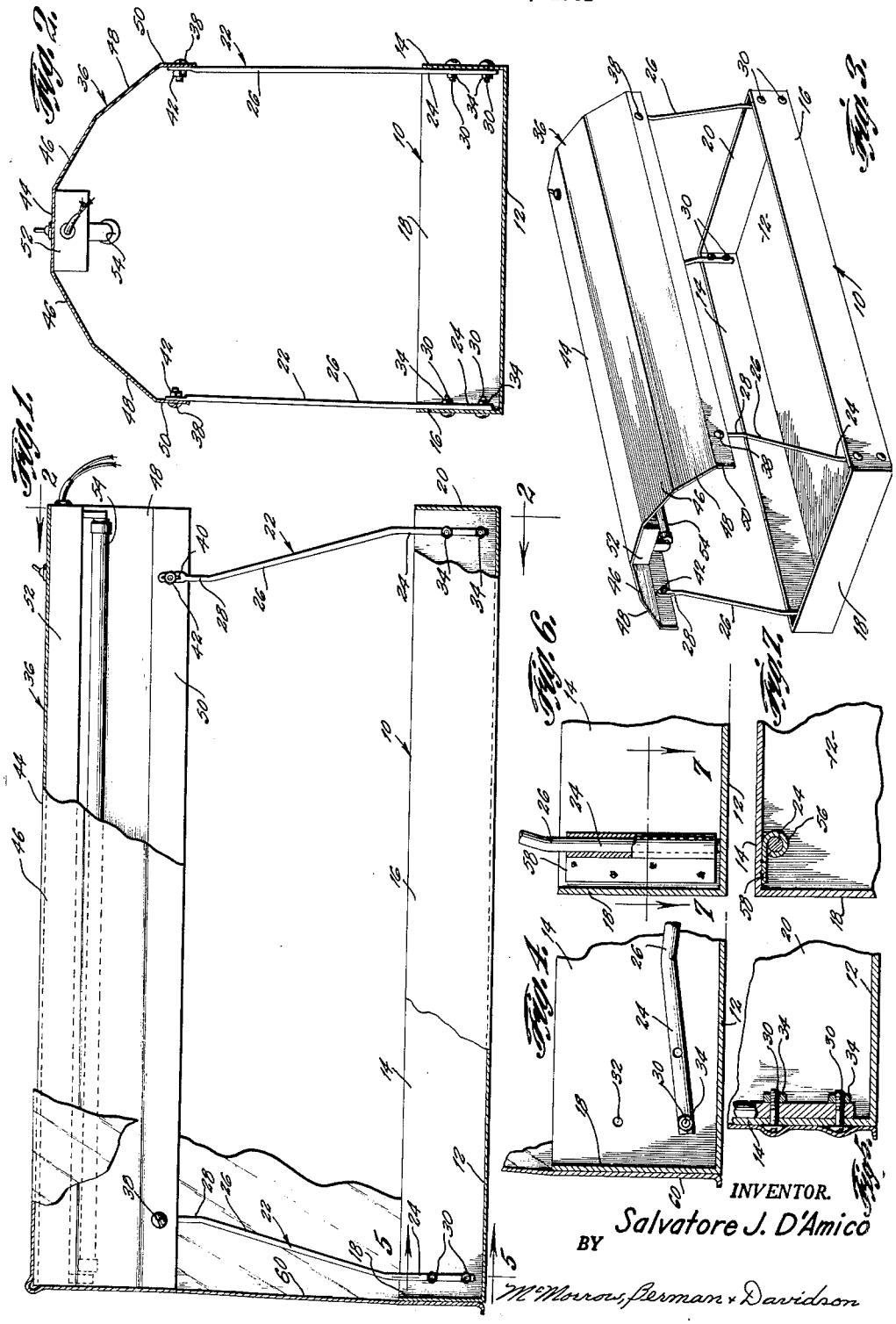
INVENTOR.
Salvatore J. D'Amico
BY
McMorrow, Berman & Davidson 3,066,445
DISPLAYER LAMP AND PLANTER
Salvatore J. D'Amico, 146 Furance Ave.,
Stafford Springs, Conn.
Filed June 23, 1961, Ser. No. 119,101
5 Claims. (Cl. 47—19)

This invention relates to illuminating devices, and in particular to a combined lamp and planter. In household horticulture, it is known that growth and health of small plants, such as African violets, are responsive, in part, to controlled, incident light, and it is an object of the invention to provide a unit conducive to a proper attainment of such control. A further object is to provide a device of this nature having a three-fold utility of providing for plant starting, plant growth, and plant display. A related object is to accomplish the foregoing with a unit which is also possessed of qualities for general purposes of illumination, in a household or business environment, including ornamentation and sales appeal. A particular object is to provide a combined lamp and grower which is easily disassembled and arranged in compact form for shipping, and which is also simple in structure, easy to manufacture, and low in cost.

These and other ends, which will be apparent to those skilled in the art, are attained by the present invention, which may be briefly described as comprising a rectangular, box-like, base container, with a longitudinally extending dome or roof, in the form of an inverted trough, supported on uprights carried at the corners of the base, the dome mounting an elongate lighting element, and serving as a directionalizing reflector.

For a more particular description of the invention, reference is made to the following specification, as illustrated in the drawing, in which:

FIGURE 1 is a side elevational view of the lamp-planter, with parts broken away, FIGURE 2 is a sectional view taken on the plane of the line 2—2 of FIGURE 1, FIGURE 3 is a perspective view of the device, on reduced scale, FIGURE 4 is a fragmentary view of a detail at the lower, left corner of the device shown in FIGURE 1, on enlarged scale, showing one of the roof-supporting uprights in folded position, FIGURE 5 is a sectional view of a detail, enlarged, taken on the line 5—5 of FIGURE 4, FIGURE 6 is a view similar to FIGURE 4, showing a modified attachment of the upright to the base, and FIGURE 7 is a sectional view taken on the line 7—7 of FIGURE 6.

Referring to the drawings by characters of reference, there is shown, a box-like, rectangular base 10 of suitable material, such as galvanized steel plate, stainless steel, aluminum, or plastic, with a flat bottom 12, two upright sides 14, 16, and two upright ends 18, 20. Each of the four uprights 22 comprises a wire of relatively small gage, formed with a double, dog-leg bend, resulting in a short, straight, lower section 24, a diagonally slanted, intermediate, straight section 26, and a short, straight, terminal, upper section 28, parallel to lower section 24. The latter has a pair of transverse bores which receive mounting screws 30, carried in matching bores 32 in the side plates 14, 16, and secured by nuts 34. The diagonally disposed sections 26 lend rigidity to the structure.

The roof or cover, 36, is mounted on the top of uprights 22, and since each of these is rigidly positioned by virtue of the pair of screws securing it to the bottom pan, only one attaching screw, 38, is needed at the top. In order to allow a degree of adjustment of the roof, the top sections 28 of the uprights have elongate slots 40, receiving the screws, the latter being carried in bores in the roof, and secured by nuts 42.

The roof or canopy 36, among other things, serves as a fixture for a lighting unit, and is formed in angularly disposed, longitudinal, panels which govern reflection of the light for optimum transmission to the plant life contained in base box 10. Thus, the canopy has an elongate, central, horizontal panel 44, flanked on each side by a similar panel 46, bent downwardly at an obtuse, dihedral angle, and each panel 46 makes a similar, dihedral angle with an outer panel 48, from which depends a vertical skirt 50, the latter having suitable perforations to receive the screws 38. Secured to the under side of central panel 44 of the canopy, is a conventional fixture 52, mounting a fluorescent tube 54.

The planter or tray 10 is imperforate, so as to hold water, and may be filled with soil for the planting of plants, seedlings, or seeds, or individual potted plants may be placed in the tray. It is also possible to place water in the tray, for hydroponic culture. In any case, the plant life will be most favorably exposed to stimulating radiation, and life-sustaining heat, in proper degree, the illmination being conserved and directionalized by the generally concave form of the canopy. Culture is also subject to control by the interchangeability of the light unit, whereby the wavelength and intensity may be changed to suit various conditions, such as sprouting from seedlings, early growth, and the sustenance of full grown plants. For instance, hot tubes, cool tubes, and daylight tubes may be employed, depending upon the particular problems and the end sought.

Aside from the horticultural advantages, the device has utility as an illuminator for ordinary household use, as on a desk, table, stand or the like, and the two purposes may be served simultaneously, in which case the plants under culture enhance the ornamental aspect of the lamp. It may also be employed to advantage commercially, as illuminating displays of merchandise.

It will be seen that the wire uprights, while adequate to their function of supporting the canopy, are unobtrusive, and especially so when the tray is plant laden, so that the canopy presents the illusion of being freely suspended.

In order to knock down the lamp for shipment or storage, it is merely necessary to remove the uprights 22 from their connection with screws 38 at the canopy, and remove the upper screws 30 of the pairs of screws securing them to the tray 10. Thereupon, the uprights may be folded downward into stowed position within the tray, and the canopy placed upon the top edge of the tray, in covering relation thereto.

In FIGURES 6 and 7, a modification is shown, in which the lower sections 24 of the uprights are supported in a tubular socket 56, having a flat, tangentially extending, terminal end 58, which may be secured to the inner face of the side wall of the tray as by soldering, or spot welding. In this form, the canopy may be lifted, to remove the uprights from the socket, after which the uprights are folded into the canopy, and the latter placed over the tray top.

The device may be equipped with a thermostat, humidity control, and suitable timing devices, and to this end, and for protection in general, from dust, insects and other foreign matter, the assembly is preferably equipped with a cover 60 of transparent plastic.

While a certain preferred embodiment has been shown and described, modifications will be apparent to those skilled in the art, in the light of this disclosure, and the invention should not, therefore, be deemed as limited, except insofar as shall appear from the spirit and scope of the appended claims.

I claim:
1. A combined illuminator and planter comprising an oblong, rectangular tray, wire uprights secured to said tray at the corners thereof, and having vertical upper and lower, terminal sections and a diagonal, intermediate section with upper end inclined toward the center of the long dimension of the tray, a canopy secured on the upper ends of said uprights, and a tubular lamp carried by said canopy, said canopy comprising an inverted trough with concavity facing the open top of said tray, and having a plurality of contiguous, rectangular panels, forming dihedral angles in pairs, with a central, horizontal panel having a fixture for mounting said lamp, a first pair of panels on opposite sides of said central panel, a second pair of panels outwardly of the respective panels of said first pair, and a vertical skirt depending from each of said second pair of panels.

2. A device as in claim 1, the lower, terminal section of each leg being secured to said tray by two fasteners, one of which is removable, and the other of which serves as a pivot for swinging movement of the upright to stowed position in the tray.

3. A device as in claim 1, the lower, terminal section of each leg being slidably mounted in a tubular socket secured to the inner face of a side of said tray.

4. A combined illuminator and planter comprising a tray, uprights carried by said tray near the corners thereof, a reflector canopy carried on the upper ends of said uprights and having a lamp fixture on its under side, said canopy being of inverted trough form with concavity facing the top opening of said tray, and having a series of planar panels with successive pairs forming dihedral angles, said uprights being pivoted to said tray, and detachably secured to said tray at a point spaced from the axis of pivoting.

5. A combined illuminator and planter comprising a tray, uprights carried by said tray near the corners thereof, a reflector canopy carried on the upper ends of said uprights and having a lamp fixture on its under side, said canopy being of inverted trough form with concavity facing the top opening of said tray, and having a series of planar panels with successive pairs forming dihedral angles, said uprights being slidably mounted in sockets carried by said tray.

References Cited in the file of this patent

UNITED STATES PATENTS

| | | |
|---|---|---|
| 1,449,772 | Miller | Mar. 27, 1923 |
| 1,816,974 | Kavanagh | Aug. 4, 1931 |
| 1,897,062 | Liermann | Feb. 14, 1933 |
| 2,810,820 | Nelson | Oct. 22, 1957 |
| 2,963,819 | Hoch | Dec. 13, 1960 |

FOREIGN PATENTS

| | | |
|---|---|---|
| 589,769 | France | Feb. 27, 1925 |
| 836,045 | France | Oct. 10, 1938 |
| 639,454 | Great Britain | June 28, 1950 |
| 826,101 | Great Britain | Dec. 23, 1959 |